(12) United States Patent
Gault

(10) Patent No.: US 12,306,977 B2
(45) Date of Patent: May 20, 2025

(54) SYSTEM AND METHOD FOR IMPLEMENTING A PERSONAL VIRTUAL DATA NETWORK (PVDN)

(71) Applicant: DYMENSA PTY LTD, Ferntree Gully (AU)

(72) Inventor: David Ian Gault, Ferntree Gully (AU)

(73) Assignee: DYMENSA PTY LTD, Victoria (AU)

( * ) Notice: Subject to any disclaimer, the term of this patent is extended or adjusted under 35 U.S.C. 154(b) by 152 days.

(21) Appl. No.: 17/904,447

(22) PCT Filed: Feb. 18, 2021

(86) PCT No.: PCT/AU2021/050136
§ 371 (c)(1),
(2) Date: Aug. 17, 2022

(87) PCT Pub. No.: WO2021/163757
PCT Pub. Date: Aug. 26, 2021

(65) Prior Publication Data
US 2023/0064543 A1 Mar. 2, 2023

(30) Foreign Application Priority Data
Feb. 18, 2020 (AU) .............................. 2020900455

(51) Int. Cl.
G06F 21/62 (2013.01)
G06F 21/60 (2013.01)
H04L 12/46 (2006.01)

(52) U.S. Cl.
CPC ........ *G06F 21/6218* (2013.01); *G06F 21/602* (2013.01); *H04L 12/4641* (2013.01)

(58) Field of Classification Search
USPC ............................................................ 726/4
See application file for complete search history.

(56) References Cited

U.S. PATENT DOCUMENTS 8,650,299 B1  2/2014 Huang et al.
10,043,029 B2  8/2018 Murray
(Continued)

OTHER PUBLICATIONS

International Search Report for corresponding International Application No. PCT/AU2021/050136 mailed Apr. 30, 2021.
(Continued)

*Primary Examiner* — Sanchit K Sarker
(74) *Attorney, Agent, or Firm* — Chrisman Gallo Tochtrop LLC

(57) ABSTRACT

An online data storage and retrieval system wherein the data storage for a particular customer, the computer processes operating upon the customer data and the communication channels across which the customer data is communicated are separated from all other data storage, computer processes and communication channels used for other customers, the separation achieved by the use of Application Containers effecting Operating System Level Virtualisation, under the control of an automated control service that allocates containers to customers for the hosting of microservices, the microservices provided by the Application Containers including a Personal Virtual Data Network (PVDN) hub including primary storage facilities that effect storage and access functions allowing services to operate the PVDN.

15 Claims, 6 Drawing Sheets

(56) References Cited

U.S. PATENT DOCUMENTS

| | | | |
|---|---|---|---|
| 10,505,903 B1 | 12/2019 | Pednekar et al. | |
| 2016/0291992 A1* | 10/2016 | Potlapally | G06F 21/53 |
| 2017/0214550 A1* | 7/2017 | Kumar | H04L 41/5045 |
| 2018/0034664 A1 | 2/2018 | Mulligan et al. | |
| 2019/0246258 A1* | 8/2019 | Ji | H04L 65/403 |
| 2020/0021577 A1* | 1/2020 | Cross, Jr. | H04L 63/0853 |
| 2020/0379793 A1* | 12/2020 | Parihar | G06F 9/45558 |

OTHER PUBLICATIONS

Written Opinion corresponding International Application No. PCT/AU2021/050136 dated Apr. 30, 2021.

International Preliminary Report on Patentability for correpsonding International Application No. PCT/AU2021/050136 dated Jun. 17, 2022.

Extended European Search Report for corresponding European Application No. 21756400.4 dated Feb. 5, 2024.

\* cited by examiner

SYSTEM AND METHOD FOR IMPLEMENTING A PERSONAL VIRTUAL DATA NETWORK (PVDN)

CROSS-REFERENCE TO RELATED APPLICATIONS

This application is a national stage entry of International Application No. PCT/AU2021/050136 filed on Feb. 18, 2021, which claims the benefit of priority to Australian Application No. 2020900455, filed Feb. 18, 2020, the entire disclosures of which are hereby incorporated herein by reference.

FIELD OF THE INVENTION

The system and method of the present invention relates to computer systems, and the operation of those systems, for the purpose of storing and possible processing of customer digital data. More particularly, the present invention relates to the storage and possible processing of customer digital data in computer facilities that are remotely located from the customer which prevents the customer from asserting physical control regarding the storage and retrieval/access to their data.

BACKGROUND OF THE INVENTION

Computing devices such as smartphones and personal digital assistants are now ubiquitous in most developed countries. In countries in which telecommunications services are less developed, the introduction of cellular phone networks is particularly attractive since it represents a relatively inexpensive infrastructure as compared with the cost associated with deploying a copper or fibre network. As cellular data communication networks increasingly dominate as the preferred communication network of choice, smartphones and personal digital assistants that use these networks to access and transmit data will become increasingly prevalent.

Whereas cellular phones and personal digital assistants were initially used predominantly for voice communications and basic text communications, with the advent of smartphones, social networking and social media applications, the amount and type of data communicated across cellular data networks has increased and includes a larger variety of data. For example, smartphones include the capability to obtain data regarding the location of the smartphone when in use. This data is often captured and stored along with images captured by the smartphone, both still and video images, along with audio and data pertaining to purchases and other transactions that customer's effect with their smartphone devices. In developed countries in which fibre networks have been installed, customers are presented with numerous options regarding high speed data communication network availability. As a result, an increasing number of devices are used by customers to connect with high speed data communication networks for the purpose of communicating with other connected customers. In addition, an increasing number of devices are now being connected to available data communication networks including laptops, personal computers, home security devices including video cameras and smart appliances that include a computer processor which, collectively, contribute to the "Internet of Things" (IoT). Further, when a customer commissions a new device or installs software, that device or software will often automatically backup and synchronise the customers data to a cloud storage provider. Often customers are not aware that their data is being backed up by cloud storage providers as a result of pre-programmed settings on the device or software they have commissioned or installed. The data collected and stored increasingly represents a profile of the customer including their photos, videos, behavioural characteristics representing their purchasing and browsing selections and possibly their political affiliations and other preferences. In addition, the ability to restrict and limit certain data types from being uploaded is difficult to manage or non-existent.

As an increasing number of devices and software providers seek to direct customer data to their online storage services, the customer's data becomes increasingly fragmented and directed to multiple locations increasing the difficulty for the customer to monitor their uploaded data and to retrieve and manage that data simply and easily.

The use of the internet is prevalent on smartphones and customers purchasing a smartphone device clearly understand the benefit of wirelessly connecting to a high speed data network with large area, or global, coverage. The ability to store and access data from anywhere without requiring connection to a wired network is particularly attractive to customers since communications can occur whilst the customer is travelling. Accordingly, customers readily perceive the benefits of operating a smartphone/computer tablet device that can connect wirelessly to a high-speed data network and the sales of these devices has increased substantially over recent years.

The advent of the internet has contributed to changing work patterns and environments with a substantial number of organisations implementing remote working arrangements for their employees rather than concentrating staff in central offices. Generally an employee will log into a central in-house server from a remote computer or some other device. However, remote working through a central server requires the cost of purchasing and maintaining the in-house server and restricts the user's ability to operate ancillary devices such as printers due to the printer or device being connected to the central server rather than the ancillary device. Despite the disadvantages, in-house servers remain the preferred method of remote working for smaller organisations due to the privacy and security concerns that cannot be addressed with cloud storage providers to protect client and other sensitive information.

Data associated with an individual or small organisation is now considered extremely valuable and customers are now becoming increasingly concerned regarding the data that has been recorded and stored with respect to their use of devices such as their smartphones, laptops, personal and work computers. In particular, customers are now concerned about how their data is accessed and used by online providers such as social media website operators, internet service providers and cloud storage providers.

Customers now understand that they are effectively trusting their personal and private data to online service providers as it is collected. Further, in the instance of a customer initially entrusting an online service provider to preserve the privacy of their data, customers are now fully aware that a particular online service provider they may initially entrust may be sold to another entity thereby transferring ownership and control away from the initially entrusted online service provider. Media reports in recent times regarding breaches of privacy and unauthorised sharing of customer data by online service providers has increased the concerns shared by customers in this regard.

Customers and small organisations concerned about their data being accessed by others, including their own internet service providers, has caused tremendous growth in the use of virtual private networks. A virtual private network seeks to encrypt a customer's data in the gateway between the customer's computer and the server they are accessing on the internet by that device. However, a virtual private network, while encrypting the customer's data from end to end, does not encrypt the data when that data is uploaded onto a cloud storage provider's server. Therefore, while a customer may take active measures to limit disclosure of their search data and communications while data is transmitted online through a virtual private network, limiting disclosure of that data cannot be easily and conveniently achieved once it reaches its destination and is stored in the cloud.

Whilst the current state of the internet causes significant privacy concerns amongst customers, there is also a significant issue regarding the fragmentation of an individual customers' data across email providers, social media providers and other internet service providers. Additionally, customers are increasingly aware that there is fragmentation of individual customers' data across the devices they operate.

Online data hosting services offer customers the ability to store data on a remotely located data storage data facility. These facilities are generally referred to as storage facilities that exist in "the cloud". As consumers and small businesses continue to increase the amount of data creation, cloud storage solutions become an attractive alternative as compared with upgrading in-house equipment to store the additional data created.

Currently, online data hosting services share the file storage for different customer data, along with sharing communication channels and server processors used to communicate and process customer data irrespective of the customer. Clearly, sharing computing resources for the purpose of storing customer data is an efficient and cost-effective approach to providing remote online data storage services. Any separation of customer data in such arrangements is solely a "logical separation" whereas in effect, customer data is intermingled with other customers when processing customer data, storing customer data, and retrieval of customer data from the storage facility.

While online data storage providers present a low-cost alternative to physical in-house storage, customers and small businesses are often discouraged from such solutions due to the security and privacy risks inherent with present online storage arrangements. Many small businesses with significant security and confidentiality requirements regarding their data, such as lawyers and doctors, are generally discouraged by their professional representative organisations from using cloud storage services due to data privacy and security risks. While those privacy and security risks may be addressed by negotiating or declining agreement to the terms and conditions of the cloud storage provider, such an option is generally not available to individual customers or small businesses, who generally cannot proceed with the service in the absence of confirming agreement with the standardised terms and conditions of the online data storage provider.

Accordingly, it is extremely difficult in such standard arrangements for customers to control their data and have confidence that their data cannot be accessed, or used, by anyone else. Further, when a customer seeks to withdraw their data from an online data storage service provider, customers clearly prefer that once their data is withdrawn no data will remain with the online service provider. According to current arrangements, no such assurance is available for customers.

Clearly, customers would prefer to have the option to transfer their data from one online data storage provider to another service provider with confidence that they have control of their own data and can make choices that reduce the risk of any improper use of their personal and private data. Also customers would prefer to have their data stored permanently in a secure location, consolidated and under their control. At the present time, there are no online data storage service providers who provide such assurance or confidence for customers regarding the privacy of their data whilst that data is stored in an online storage facility to the extent that customers prefer.

The present lack of any such facilities for customers to confidently retain privacy of their stored data is exacerbated by the current arrangements in which device manufacturers effectively provide services to customers upon purchase of the manufacturers' smartphone and/or computer tablet device. The provision of online storage services by device manufacturers assists the manufacturers to "lock-in" customers to the services provided by the device manufacturer subsequent to the purchase of the manufacturer's device. This clearly assists device manufacturers to increase their revenue with charges for services that are enjoyed by customers subsequent to the purchase of the device.

However, device manufacturers maintaining control of users' private and confidential data stored in online data storage facilities is becoming an increasingly unacceptable proposition to customers.

Accordingly, there is a need for an efficient and cost effective solution to provide online data storage to customers that takes advantage of the cost efficiencies of storing data for a large number of customers, whilst also providing a service in which customers can be confident that their personal and private data cannot be accessed and shared without their knowledge and authorization and consolidated in a manner that facilitates management, control and access by the data owner.

There is also a need for such an online data storage facility to provide data storage that is "device agnostic" that will receive and store data from any smartphone or computer tablet/personal computer manufacturer, thereby removing reliance upon the online data storage services provided by any particular device manufacturer.

SUMMARY OF THE INVENTION

In one aspect, the present invention provides an online data storage and retrieval system wherein the data storage for a particular customer, the computer processes operating upon the customer data and the communication channels across which the customer data is communicated are separated from all other data storage, computer processes and communication channels used for other customers, the separation achieved by the use of Application Containers effecting Operating System Level Virtualisation, under the control of an automated control service that allocates containers to customers for the hosting of microservices with each Application Container configured to house only a single microservice, the microservices provided by the Application Containers including a Personal Virtual Data Network (PVDN) hub-including primary storage facilities that effect storage and access functions necessary to enable services to operate the PVDN, wherein the PVDN includes a secondary storage facility solely for storing client data (PVDN secondary data)

and storage of PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities thereby avoiding the PVDN hub acting as a file server to effect the transfer of client data.

The use of Application Containers effected as Operating System Level Virtualisation substantially restricts the ability of anyone seeking unauthorised access to a customer's data since the software implementing the Application Container enjoys the protection of services effected at the operating system level. Further, Application Containers may solely house and serve PVDN primary storage facilities handling small record and small file data only. In one embodiment, the customer's passwords or other access methods never exit the Application Container such that they cannot become known to any other party. In an embodiment, PVDN secondary storage facilities effect storage and retrieval of customer file data such that separation of customer record based and small file data in PVDN primary storage facilities and customer large file data in PVDN secondary storage facilities enables further efficiencies with respect to operation of the online data storage and retrieval system. In this embodiment, the PVDN secondary storage facilities effect transfer of data directly to, and from, customer devices and hence avoid the processing load associated with transfer of customer file data through Application Containers.

In this regard, a PVDN will be understood by skilled readers to mean a virtual network operating on standard networking protocols which securely connect internet connected devices belonging to a customer to a centralised data store. Customer devices may include mobile devices, personal computer, laptops and IoT devices, and recording equipment. Skilled readers will also understand that a customer could be an individual, a couple, a family or a small organisation with all communications connections, processing and storage remaining exclusive to the customer.

Skilled readers will also understand that the PVDN primary data storage facility may be record based or small file data that is aggregated and permanently stored by, and through, the customer microservice on the Application Container which is used primarily to synchronise data between PVDN enabled devices and keep track of devices and store and provide credentials and access details needed to access cloud storage providers in addition to recording encryption keys/cryptographic hashes and file details that enable the PVDN secondary storage facility. In this regard, skilled readers will understand that the PVDN secondary data storage facility may be file based data transferred directly between PVDN enabled devices and a mass storage facility using the PVDN to record file details including device, storage provider, file name, tags to identify files, encryption keys and cryptographic hashes.

In an embodiment, the data storage and retrieval system also provides processing services in respect of the data stored for customers.

PVDN enabled devices are digital devices that contain one or more PVDN enabled application programs. A PVDN application program is a program which contains, or references, digitally encoded drivers (PVDN client library components) to exchange data with the PVDN. Generally, this data exchange will fall into one of three categories, namely:

1) record based data used to synchronise and manage devices such as contacts, appointments and device locations etc;
2) data from external information systems captured by devices and transferred to the PVDN for aggregation and permanent storage; and
3) file based data generated on the PVDN enabled device, or used on the device, that is encrypted/decrypted by the device and stored in mass storage but using PVDN to manage keys and hashes.

Examples of data falling within category 2 includes email correspondence and examples of data falling within category 3 include images, videos, documents, activity tracking data from devices worn by customers, etc.

The PVDN may be used to efficiently store, process and retrieve data of any type on behalf of a PVDN enabled device. In one embodiment, internet connected devices are PVDN enabled by the installation of an appropriately configured PVDN enabled application program.

PVDN enabled application programs may be created by a PVDN service provider, a device provider and/or any authorised third party. A PVDN client library with components which effect direct communication with the PVDN would generally be provided by a PVDN service provider. Such communication would generally require the PVDN enabled device or application program to access the PVDN using credentials stored within the PVDN hub to authenticate itself and access PVDN services. Other authentication methods may be to ensure that PVDN enabled devices and applications only connect and join a PVDN to which they are authorised.

Separation of control of Application Containers from the hosting of the Application Containers increases the privacy of customer data by reducing the role of the hosting company to solely providing a standard Application Container with appropriate pre-configured separations. Similarly, the control network need only send and issue commands to control the tenancy of the Application Container rather than data management preventing access to the customers' data. This separation also allows flexible deployment options that substantially reduce the cost of implementation.

In one embodiment, separation of control of record, or small file based customer data (primary storage facilities), and the customer large file based data (secondary storage facilities) enables significant system efficiencies to be achieved regarding the secondary storage requirements and also allows communication between the primary and secondary storage facilities to be constrained regarding functionality and protocol. In particular, this arrangement allows secondary storage facilities to be provided by existing online data storage arrangements that exist "in the cloud" because of the encryption of the secondary data. These existing online data storage facilities are well established and include extensive power supply facilities including redundancy in the event of power failure in any one or more sources of electrical power along with redundancy of storage media and physical security for the remote data storage facilities.

Constraining functionality regarding the communication between the primary and secondary storage facilities has clear benefits with respect to security of any transfer and this arrangement also avoids the load associated with transferring data from a secondary storage facility through an Application Container. However, in one embodiment, encryption and cryptographic hashes are stored in the PVDN primary storage facility. Accordingly, without access to the PVDN primary storage facility, meaningful data cannot be obtained from the secondary storage since the data stored in the PVDN secondary storage facility is encrypted and, in this way, the PVDN primary storage facility controls the PVDN secondary storage facility without performing data transfers. In this embodiment, data transfers from secondary storage facility occurs directly to PVDN enabled devices under the control of the PVDN primary storage facility.

In another embodiment, Application Containers are controlled by a central location with respect to assignment of Application Containers to customers. In this embodiment, the Application Container accepts and serves data to/from the customer whilst simultaneously under the control and surveillance by the system that hosts Application Containers. In this regard, there is a separation of concerns into three separate parts, namely, the provider of the Application Container that is controlled from a central location and who controls the assignment and "occupancy" of Application Containers by customers, the host of Application Containers (the entity that hosts Application Containers which may be hosted on a cloud server providing the necessary computer processing power, communication ports, computer memory and storage) and the customer who is allocated an Application Container and whose data is controlled and operated upon by the PVDN. This arrangement provides a substantial level of privacy regarding customer data and provides customers with a facility that is private and device and service provider agnostic which accommodates the requirements of customers seeking to achieve better control of their online data. Further, the arrangement is scalable such that it may be provided to many customers whilst maintaining costs to a minimum thus enabling providers to provide such a service to customers at an affordable cost or at least, a cost that is less as compared with currently available arrangements.

In an embodiment, the system includes arrays of identical Application Containers with each Application Container assigned to a separate customer account.

In one embodiment, the PVDN provides encryption keys to encrypt customer file data as it is submitted for storage in the PVDN secondary storage facility. This protects the customer file data since it resides in the PVDN secondary storage facility in an encrypted form and of course, retrieving customer file data is effected by the PVDN which uses the encryption key to decrypt customer file data at the time it is retrieved from the PVDN secondary storage facility.

The system may generate random encryption keys for the PVDN secondary storage facility to use for the purpose of encrypting data, but which are stored in the PVDN primary storage facility. The customer need not provide, or know, these keys since they are stored in, and provided by, the PVDN primary storage facility. The PVDN primary storage facility may also store the cryptographic hashes of the files stored by the PVDN secondary storage facility so that it can be confirmed that no tampering has taken place regarding the data at the point of decrypting same. In another embodiment, the cryptographic hashes may be used to implement some, or all, of the PVDN secondary storage facilities.

In another embodiment, access to the PVDN by customers is controlled by a combination of standard authentication processes including multi-factor authentication with all authentication data stored within an individual customer's PVDN. In this embodiment, customers have a set of credentials enabling them to connect to their PVDN microservice using a PVDN portal or their PVDN enabled devices. These authentication mechanisms are preferably created and maintained by the customer and recorded in the data storage of the PVDN primary storage facility of the PVDN. A separate authentication process may be used to connect to the portal of the controlling server (network) thereby enabling them to interact with the entity that provides the PVDN.

In an embodiment, the entire contents of the PVDN primary storage is copied from the PVDN hub to a customer's device to back up the current state of the PVDN for redundancy purposes or to transfer the PVDN to a different PVDN. Likewise, a previously copied PVDN primary storage may be copied from a customer's device into the PVDN hub to restore a PVDN to a previous state after a data corruption or to allow customers to migrate from one PVDN service to another. In an embodiment, the PVDN primary storage data is encrypted throughout the process of a backup and/or restore. Similarly, the PVDN service provider and/or PVDN hosting provider may use the same mechanisms to upgrade the PVDN, or move the PVDN hub, to a new hosting location without requiring access to the PVDN primary data since the encryption with the primary encryption key is known only to the customer.

In the event that a customer terminates the agreement with the service provider, they can extract their data from the primary data storage facility. If the data in secondary storage is stored with cloud providers with whom the customer has a separate commercial arrangement, the secondary data may remain in such storage since the customer owns, and has access to, the file details, encryption keys and cryptographic hashes that relate to the stored encrypted data blocks. Alternatively a customer may choose to use the PVDN to extract and decrypt all secondary data to a device prior to terminating the service. The Application Container effectively becomes available for another customer and a new customer may be provided access to the Application Container by provision of a new password. If they are an existing customer they may transfer their PVDN primary data (previously extracted from another PVDN) into the Application Container via a port thus providing them access to all of their primary and secondary data. If they are a new customer they may register their devices on the PVDN and commence collecting and managing both record based and file based data in their primary and secondary storage facilities.

Application Containers preferably encrypt customer file data as it is provided to the PVDN secondary storage facility and decrypt the data as it is retrieved from the PVDN secondary storage facility using encryption keys generated by the system and stored in the PVDN primary storage facility. Preferably, communication lines are also encrypted which may be effected by use of the HTTPS protocol wherein the encryption for communications in accordance with this protocol generate their own encryption keys with the end points of the encrypted tunnel being the device and the microservice in the Application Container to prevent 'man in the middle' attacks on any data transferred or the loss of data privacy.

In another embodiment, the primary encryption key that protects PVDN primary data while at rest in storage is entered on demand by the customer thereby avoiding the requirement to store the primary encryption key anywhere in the system except volatile memory. In the event the system is restarted, either due to failure, deliberate restart or an Application Container upgrade, the primary encryption key is again entered on demand by the customer and cannot be retrieved by the system from anywhere within the system except when residing temporarily in volatile memory. The primary encryption key may include a passphrase, security token or similar mechanism for providing strong encryption keys in a user friendly manner.

In a preferred embodiment, Application Containers are pre-configured regarding the services provided and have facilities for remote access and remote control of the Application Container. In a preferred embodiment, access to the Application Container by the PVDN service provider and PVDN hosting company is restricted to various logs and diagnostic information but without providing access to the PVDN primary data. The control and data access mechanism may be web-based. Further, the container hosting service provider will provide services to Application Containers with ports and secondary storage memory space pre-configured and available for provision to many Application Containers.

In a particularly preferred embodiment, remote control and access provided by a PVDN is restricted to pre-defined actions. For example, actions may be restricted solely to those such as executing a query, executing a copy command and/or an insert command regarding customer record and file data. Restricting actions to pre-defined functions that may be implemented by the PVDN in a manner such as a Web API further enhances security associated with operations that may be performed upon customer file data and hence, increases confidence regarding any unauthorised access or operations with respect to customer file data. Effectively, the available options for a malicious hacker to obtain access to a customer's data is substantially reduced as compared with current arrangements that provide the services described.

Such functions may be assigned various security and permission levels to further enhance security. New versions of the PVDN host microservice with a modified enhanced set of pre-defined actions would likely be released from time to time. A customer may cease tenancy of an instance of the microservice of an older version and commence tenancy of an instance of a newer version of the microservice in order to effect an upgrade of services. The customer's encrypted PVDN primary data at rest would be transferred from one container to another so that the enhanced PVDN could resume without customer data loss or loss of data privacy or loss of data privacy. In another aspect, the present invention provides a method of establishing an online data storage and retrieval system including the following steps establishing an Application Container for effecting Operating System Level Virtualisation under the control of an automated control service that allocates containers to individual customers for the hosting of microservices with each Application Container configured to house only a single microservice, establishing a Personal Virtual Data Network (PVDN) hub including primary storage facilities to effect storage and access functions necessary to enable services to operate the PVDN, wherein the PVDN includes a secondary storage facility solely for storing client data (PVDN secondary data) and storage of PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities thereby avoiding the PVDN hub acting as a file server to effect the transfer of client data and ensuring that the data storage for a particular customer, the computer processors operating upon the customer data and the communication channels across which the customer data is communicated are separated from all other data storage, computer processors and communication channels used for other customers. In yet another aspect, the present invention provides a computer readable medium including computer instruction code that, when executed, causes the establishment of an online data storage and retrieval system, the computer instruction code causing establishment of an Application Container effecting Operating System Level Virtualisation under the control of an automated control service that allocates containers to customers for the hosting of microservices with each Application Container configured to house only a single microservice, the microservices provided by Application Containers, establishment of a Personal Virtual Data Network (PVDN) hub including primary storage facilities that effects storage and access functions allowing services to operate the PVDN, wherein the PVDN includes a secondary storage facility solely for storing client data (PVDN secondary data) and storage of PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities thereby avoiding the PVDN hub acting as a file server to effect the transfer of client data and the computer instruction code, when executed, further ensuring that the data storage for a particular customer, the computer processors operating upon the customer data and the communication channels across which the customer data is communicated are separated from all other data storage, computer processes and communication channels used for other customers.

DETAILED DESCRIPTION OF EMBODIMENT(S) OF THE INVENTION

One or more embodiments of the present invention is described below with reference to the Figures.

In an embodiment, the present invention provides an online data storage and retrieval system wherein the data storage for a particular customer, the computer processors operating upon the customer data and the communication channels across which the customer data is communicated are separated from all other data storage, computer processes and communication channels used for other customers, the separation achieved by the use of Application Containers effecting Operating System Level Virtualisation, under the control of an automated control service to allocate containers to customers for the hosting of microservices. In the embodiment described, the allocation of containers to customers is analogous to a tenancy arrangement. The microservices provided by the Application Container include: a Personal Virtual Data Network hub (PVDN hub) including primary storage facilities that effect storage and access functions allowing devices to operate the PVDN; and secondary storage facilities for storage and retrieval of customer large file data. Separation of customer record and small file based data and customer large file data in the primary and secondary storage facilities respectively enables Application Containers to efficiently store and serve large amounts of customer file data in/from a separate online secondary storage facility as compared with the PVDN primary storage facility.

Figure 1:
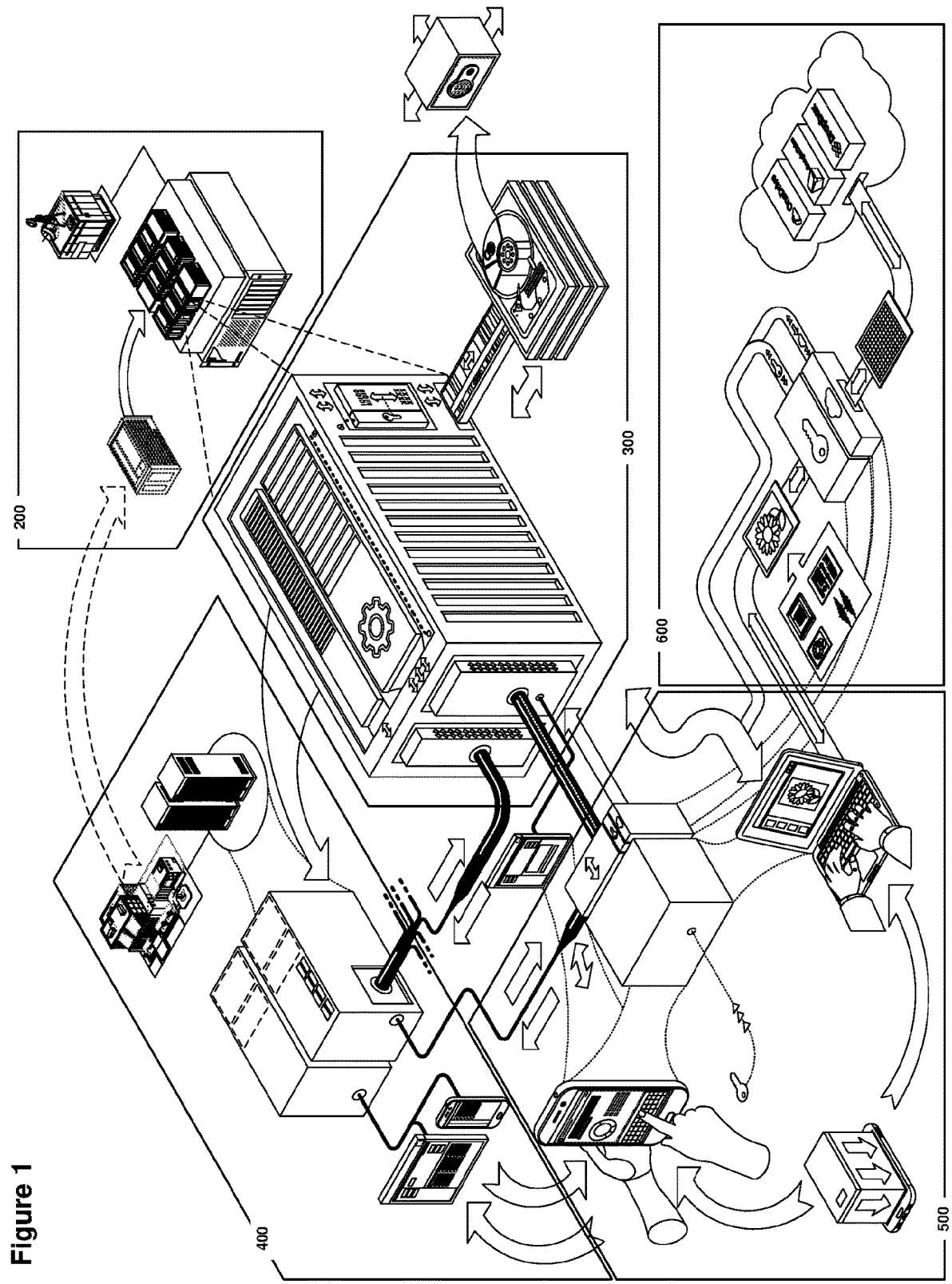
FIG. 1 illustrates a top-level block diagram of a system and method for implementing a Personal Virtual Data Network (PVDN) according to an embodiment of the invention.

FIG. 1 provides an overview of an implementation of a Personal Virtual Data Network (PVDN), which is configured for the management of personal data in the cloud that provides security, privacy, convenience and prevents vendor "lock-in" to device and cloud storage providers. FIG. 1 is separated into a number of segments, namely, 200 to 600, which are discussed in detail below with reference to FIGS. 2 to 6. Segment 200 depicts the hosting infrastructure for the described system including a service host that executes containerisation software that provides application containers for running multiple instances of PVDN host containers that can be allocated to clients. Segment 300 shows a single instance of a PVDN host container with its primary storage for small data, cryptographic keys, passwords etcetera, and its interactions with clients and applications via PVDN services to manage secondary storage of volume data such as photos and videos. Segment 400 provides management services for the system, including a client portal and tenancy controller for allocating PVDN instances to clients. Segment 500 details the client interaction with the system to manage their PVDN enabled devices and enter a primary encryption key. Secondary storage for volume data is handled in segment 600, avoiding, but effectively controlled by, the PVDN. The data is encrypted and can be hosted by conventional cloud storage providers.

The use of Application Containers (50) effected as Operating System Level Virtualisation substantially restricts the ability of anyone seeking unauthorised access to a customer's data since the software implementing the Application Container enjoys the protection of services effected at the operating system level. Further, an Application Container solely housing and serving PVDN primary storage facilities via its Microservice with the PVDN secondary storage facilities effecting the transfer of data directly to and from customer devices excludes the processing load associated with transfer of customer file data through Application Containers.

In this regard, a PVDN will be understood by skilled readers to mean a virtual network operating on standard networking protocols which securely connect the internet connected devices belonging to a customer to a centralised data store. Customer devices may include mobile devices, personal computer, laptops and IoT devices, and recording equipment. Skilled readers will also understand that a customer could be an individual, a couple, a family or a small organisation with all communications connections, processing and storage remaining exclusive to the customer.

In the event that a customer terminates the agreement with the service provider, they can extract their data from the PVDN primary data storage facility (110a). If the data in the PVDN secondary storage (220) is stored with cloud providers with whom the customer has a separate commercial arrangement, the secondary data may remain in such storage since the customer owns and has access to the file details, encryption keys and cryptographic hashes that relate to the stored encrypted data blocks. Alternatively a customer may choose to use the PVDN to extract and decrypt all secondary data to a device prior to terminating the service. The Application Container effectively becomes available for another customer. A new customer may be provided access to the Application Container (50) by provision of a new password. If they are an existing customer they may transfer their PVDN primary data (previously extracted from another PVDN) into the Application Container via a port thus providing them access to all of their primary and secondary data. If they are a new customer they may register their devices on the PVDN and commence collecting and managing both record based and file based data in their primary and secondary storage facilities.

Figure 2:
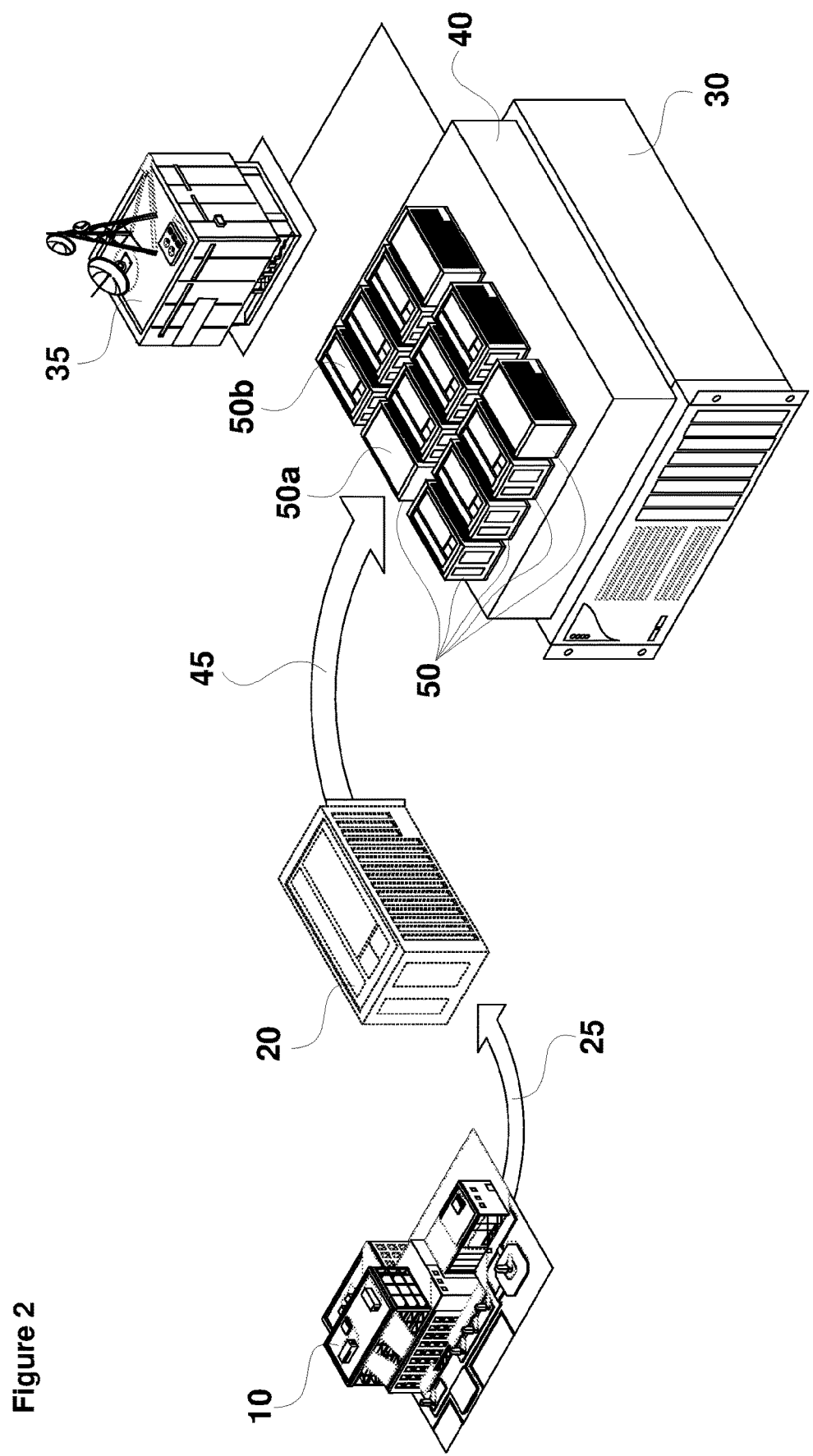
FIG. 2 illustrates the hosting infrastructure for the system which supports containerised PVDN services.

FIG. 2 shows in greater detail the components in segment 200 which provides the hosting infrastructure of the system for hosting the PVDN Containers. The system owner (10) designs, builds and tests (25) and makes available a 'template' application container image (20) capable of the entirety of the functionality to run a PVDN hub microservice for a customer. These templates are then instantiated (45) by the cloud hosting services provider (35) on one or many service hosts (30) that provide suitable containerisation software (40). The service hosts may be physical or virtual servers run by any suitable supplier of cloud hosting services. Their task is to host instances of the PVDN containers (50) assigning ports and storage and an appropriate level of security, connectivity and availability. Initially PVDN instances (50) are set with a 'vacant' tenancy status (50a), once allocated to a customer they are given an 'allocated' status (50b). The PVDN hub (105) provides various microservices housed inside an 'Operating System Level Virtualisation Container' allowing the PVDN of many customers to co-exist independently on a single cloud-based server. The Microservices are designed as automata to run continuously without the need for intervention by technical staff. They can be assigned to customers and unassigned remotely via the Microservice Tenancy Controller (140).

Separation of control of Application Containers (10) from the hosting of the Application Containers (35) increases the privacy of customer data by reducing the role of the hosting company to solely provide a standard Application Container with appropriate pre-configured separations. Similarly, the control network need only send and issue commands to control rather than data management commands preventing access to the customers' data. This separation also allows flexible deployment options that substantially reduce cost of implementation.

In one embodiment, separation of control of record based and small file customer data (PVDN primary storage facilities) (100a) and the customer large file based data (PVDN secondary storage facilities) (220) enables significant system efficiencies to be achieved regarding the secondary storage requirements and also allows communication between the primary and secondary storage facilities to be constrained regarding functionality and protocol. In particular, this arrangement allows secondary storage facilities to be provided by existing online data storage arrangements that exist "in the cloud" because of the encryption of the secondary data. Existing online data storage facilities are well established and include extensive power supply facilities including redundancy in the event of power failure in any one or more sources of electrical power along with physical security and media redundancy for the remote data storage facilities.

Constraining functionality regarding the communication between the primary and secondary storage facilities has clear benefits with respect to security of any transfer and this arrangement also avoids the load associated with transferring data from a secondary storage facility through an Application Container (50). However, in this embodiment, credentials and access details needed to access cloud storage providers, file details and encryption and cryptographic hashes (240,245) are stored in the PVDN primary storage facility. Accordingly, without access to the PVDN primary storage facility, meaningful data cannot be obtained from the secondary storage since the data stored in the PVDN secondary storage facility (220) is encrypted and in this way the PVDN primary storage facility controls the PVDN secondary storage facility without performing data transfers. In this embodiment, data transfers from the PVDN secondary storage facility are provided directly to PVDN enabled devices under the control of the PVDN primary storage facility (250).

In another embodiment, Application Containers are controlled by a central location with respect to assignment of Application Containers to customers (74). In this embodiment, the Application Container accepts and serves data to/from the customer (60) whilst simultaneously under the control and surveillance by the system that hosts Application Containers. In this regard, there is a separation of concerns into three separate parts, namely, the provider of the Application Container that is controlled from a central location and who controls the assignment and "occupancy" of Application Containers by customers (10), the host of the Application Containers (35) (the entity that hosts Application Containers which may be hosted on a cloud server providing the necessary computer processing power, communication ports, computer memory and storage) and the customer (160) who is allocated an Application Container and whose data is controlled and operated on by the PVDN under their direct control. This arrangement provides a substantial level of privacy regarding customer data and provides customers with a facility that is private and also both device and service provider agnostic which accommodates the requirements of customers seeking to achieve better control of their online data. Further, the arrangement is scalable such that it may be provided to many customers whilst maintaining costs to a minimum thus enabling providers to provide such a service to customers at an affordable cost.

In an embodiment, the system includes an array of identical Application Containers (50) with each Application Container assigned to a separate customer account.

In one embodiment, the customer provides, or the PVDN (host or device) generates, encryption keys (240) to encrypt (230) customer file data (250) as it is submitted for storage in the PVDN secondary storage facility. This protects the customer file data since it resides in the PVDN secondary storage facility in an encrypted form and of course, retrieving customer file data is effected by the PVDN which uses the encryption key (240) to decrypt (230) customer file data (250) at the time it is retrieved from the PVDN secondary storage facility.

The system may generate random encryption keys (240) for the PVDN secondary storage facility to encrypt data but which are stored in the PVDN primary storage facility.

The customer need not provide, or know, these keys since they are stored in, and provided by, the PVDN primary storage facility. The PVDN primary storage facility may also store the cryptographic hashes (245) of the files stored by the PVDN secondary storage facility so that it can be confirmed that no tampering has taken place with the data at the point of decrypting same.

In another embodiment, access to the PVDN by customers (160) is controlled by a combination of standard authentication processes including multi-factor authentication with all authentication data stored within an individual customer's PVDN. In this embodiment, customers have a set of credentials enabling them to connect to their PVDN microservice. These authentication mechanisms are preferably created and maintained by the customer and recorded in the data storage of the PVDN primary storage facility of the PVDN (100*a*). A separate authentication process may be used to connect to the portal of the controlling server (network) thereby enabling them to interact with the entity that provides the PVDN service (10).

Figure 3:
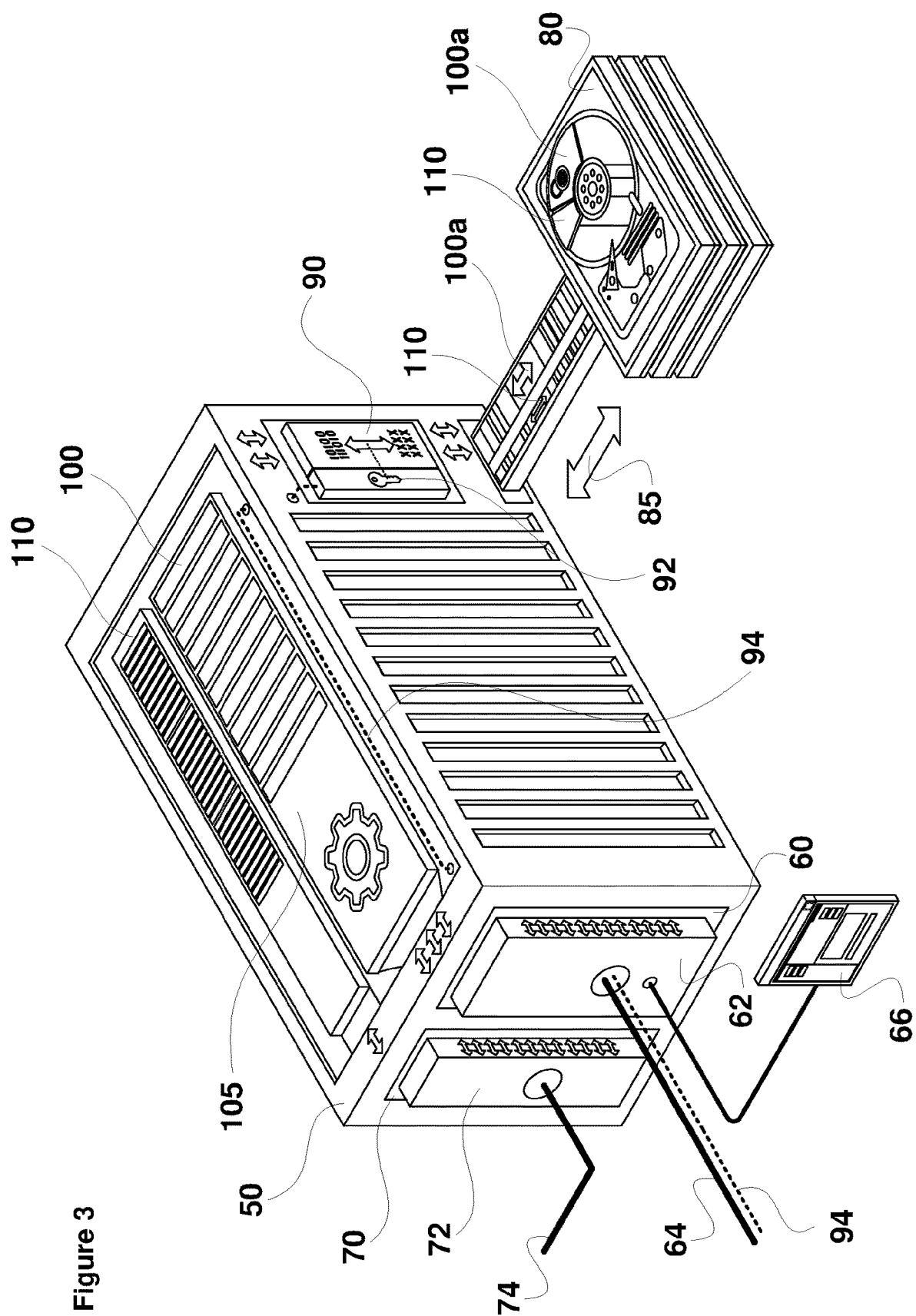
FIG. 3 illustrates a single instance of a PVDN.

Segment 300 is shown in greater detail in FIG. 3 and depicts a single instance of a PVDN container (50) and its associated primary storage (80). The PVDN provides a customer port (60) for an individual customer's PVDN management and data, a control port (70) for system level management via a microservice tenancy controller, and storage for status information and primary data in memory and via a persistent storage process (85).

A customer port (60) exposes a web API (62) onto the internet via HTTPS which supports data and management of the PVDN for a single customer. The API provides customer microservice portal (66) which gives some basic housekeeping functionality including the ability to back-up the primary data, ability to take control of the container etc. Handling of primary data and the data required to effect handling of secondary (i.e. bulk) data is handled by various applications communicating (64) with the PVDN using the web.

The control port (70) communicates (74) with the microservice tenancy controller (discussed further below in the context of segment 400) via a UDP or similar control interface (72). The microservice tenancy controller monitors the container status, and can send control instructions to change the container's primary status from Vacant to Tenanted, Suspended etc.

The PVDN instance directly stores both system level status data (110), and customer primary data (100*a*). Status data include access logs and other operational information so the PVDN instance can operate as an automaton. Customer primary data is high value record based data such as calendar entries, contacts, notes, registers, lists, passwords, keys and locations. The primary data is encrypted at rest (90,100*a*) using a primary encryption key or keys (92) and is therefore secure. It can be backed up to a variety of locations including customer devices outside the PVDN, providing a high level of confidence regarding the independence of the customer data in the PVDN. The primary data may also include details of devices, users and passwords for the PVDN, and also cloud storage provider credentials and access details, encryption keys, hashes and file details for secondary customer data storage and retrieval. The primary encryption key is preferably never stored within the container/microservice nor on a customer device except in volatile memory, but instead provided directly (94) by the customer on initiating the PVDN or in the event there is a need to restart the customer microservice (105).

At frequent intervals the customer microservice persists (85) the status data (110) and PVDN primary data (100) from memory to one or more persistent (or non-volatile) data storage areas (80) encrypted (90,100*a*) using the primary encryption key(s) (92). The independence of the customer data is based on the encryption of the primary data at rest, the data neutrality of the container/microservice and the maintenance of all keys, hashes and file details within the primary data. The primary data at rest in an encrypted state can be viewed as a safe with a combination lock (with the combination being the primary encryption key), and as such can be backed up, copied out of the PVDN or moved to another container/microservice (50) in the event of an upgrade or change of host server, but remains only accessible to the customer. The primary data at rest in an encrypted state can be considered as representing a snapshot of the state of the entire PVDN and care would be taken in the configuration of the PVDN microservice to ensure it represents the complete state.

Skilled readers will also understand that the primary data storage facility is record based data that is aggregated and permanently stored by, and through, the customer microservice (105) on the Application Container which is used primarily to synchronise data between PVDN enabled devices and keep track of devices and record encryption keys/cryptographic hashes that enable the PVDN secondary storage facility. In this regard, skilled readers will understand that the PVDN secondary data storage facility is file based data transferred directly between PVDN enabled devices and a mass storage facility using the PVDN to record file details including device, cloud storage provider credentials and access details, file name, tags to identify files, encryption keys and cryptographic hashes.

PVDN enabled devices are digital devices that contain one or more PVDN enabled application programs. A PVDN application program is a program which contains or references digitally encoded drivers (PVDN client library components) to exchange data with the PVDN. Generally, this data exchange will fall into one of three categories, namely:

1) record based data used to synchronise and manage devices such as contacts, appointments and device locations (190) etc;
2) data from external information systems captured by devices and transferred to the PVDN for aggregation and permanent storage (190); and
3) file based data generated on the PVDN enabled device, or used on the device, that is encrypted/decrypted by the device and stored in mass storage (250) but using PVDN to manage keys and hashes.

Examples of data falling within category 2 includes email correspondence and examples of data falling within category 3 include images, videos, documents, activity tracking data from devices worn by customers, etc.

The PVDN may be used to efficiently store, process and retrieve data of any kind on behalf of a PVDN enabled device (150). Potentially any internet connected device could be PVDN enabled by the installation of an appropriately configured PVDN enabled application program (160).

PVDN enabled application programs may be created by a PVDN service provider, a device provider and/or any authorised third party. The PVDN client library components (166) which effect direct communication with the PVDN would generally be provided by the PVDN service provider.

Figure 4:
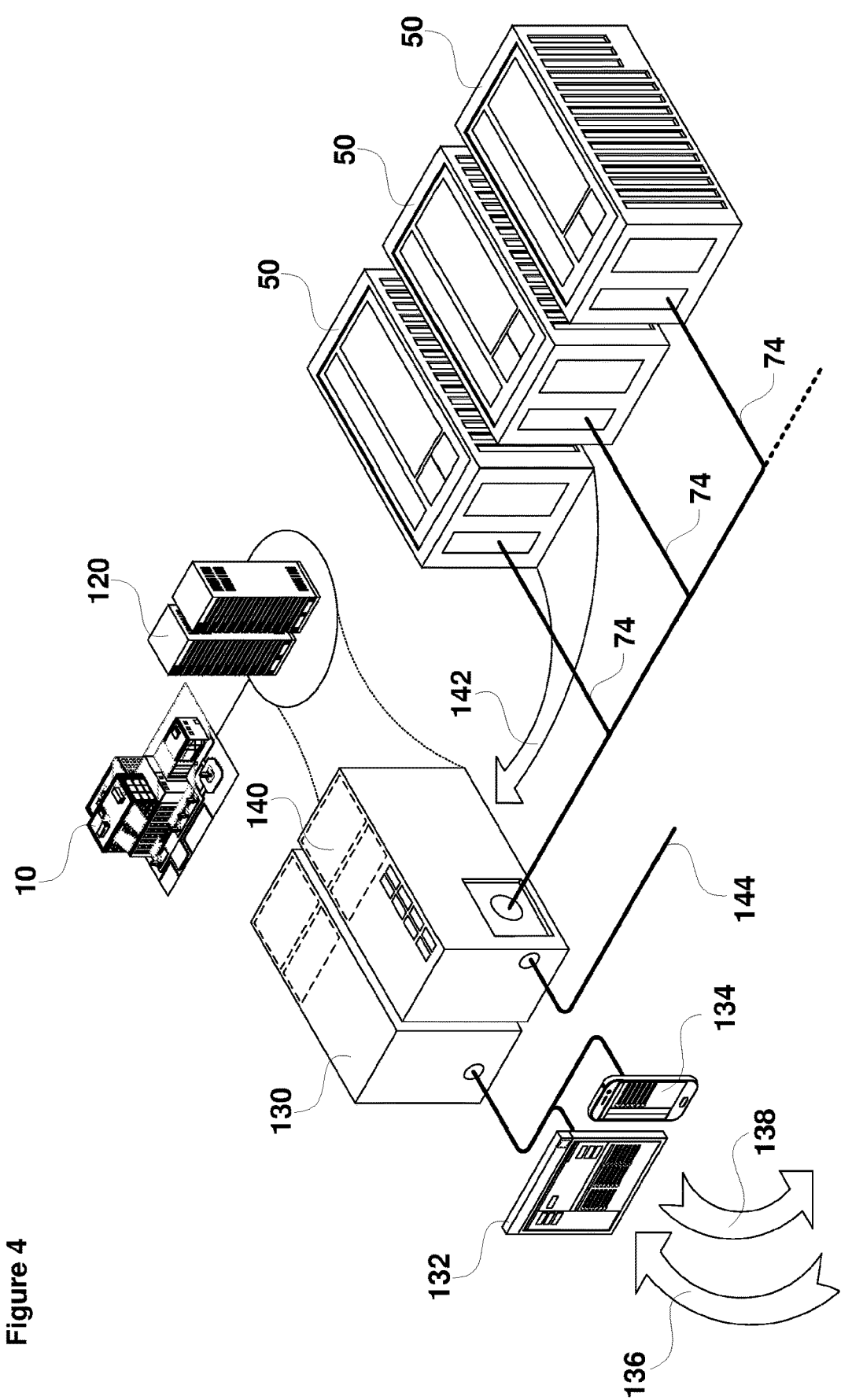
FIG. 4 illustrates management services for the system.

High level management of the system is depicted in segment 400 as illustrated in FIG. 4 which includes two major components: customer portal (130) and microservice tenancy controller (140), both of which are run on control server (120) which provides a microservice control system.

The customer portal (130) allows the user to subscribe to the service and order one or more data microservices to set up a PVDN for their exclusive use. The user initiates a subscription with the solution owner (10) by registering (136) on the customer portal, typically entering their details and payment information. Access to the customer portal is via a web interface (132) or mobile interface (134). After registration (136), the customer portal would bill the customer (138) as per the commercial arrangements between the customer and the PVDN service and provide a password to initiate access to their allocated PVDN Container microservice (105).

The microservice tenancy controller (140) manages all vacant and allocated microservices. Once instantiated, a container instance (50) will communicate (74) with the microservice tenancy controller and register itself (142) as a vacant service. It will remain vacant until a customer is allocated the container/microservice. Once a user registers with the system the microservice control system allocates them an appropriately selected vacant container microservice by sending it Control Instructions.

Figure 5:
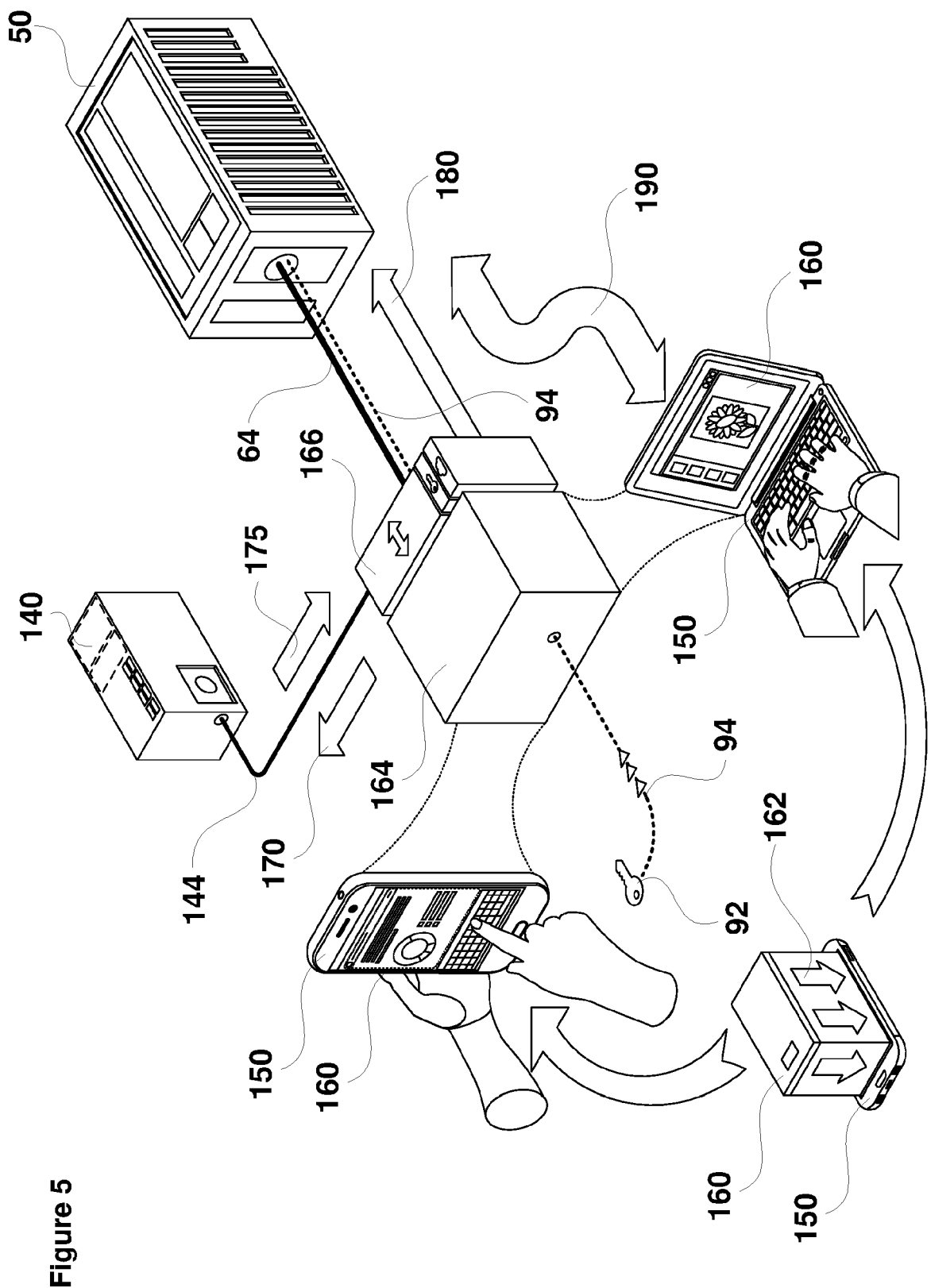
FIG. 5 illustrates client interaction with the system to manage their PVDN instances and data storage, and store and retrieve large data objects using secondary storage.

FIG. 5 details segment 500 which shows client interaction with the PVDN system. The PVDN is accessed by a customer across a range of access devices (150) owned by the customer including mobile phones, tablets, laptops, personal computers, IoT devices and/or home/small business servers by downloading and installing (162) PVDN enabled applications (160). The applications may be provided by the PVDN system owner (10) or any third-party software developers appropriately registered. The PVDN enabled applications (160) contain PVDN client library components (166) that allow them to communicate (64) with the customer's PVDN microservice to freely transfer (190) primary data, including data to effect secondary data transfers (as discussed in relation to FIG. 6 below). The PVDN microservice (105) is designed to handle data in generic manner allowing data of all kinds of data from calendar entries to video files to be managed for a potentially unlimited range of applications.

Using the connection details (175) (IP Address, Port) which are obtained (144) from the microservice tenancy controller (140), the PVDN enabled applications (160) connect (180) to the PVDN microservice (50) via a secure connection (e.g. HTTPS). The user is authenticated using standard authentication techniques (e.g. username/password). Initially and on occasions, there may be a need to supply (94) the Primary Encryption Keys (92).

Figure 6:
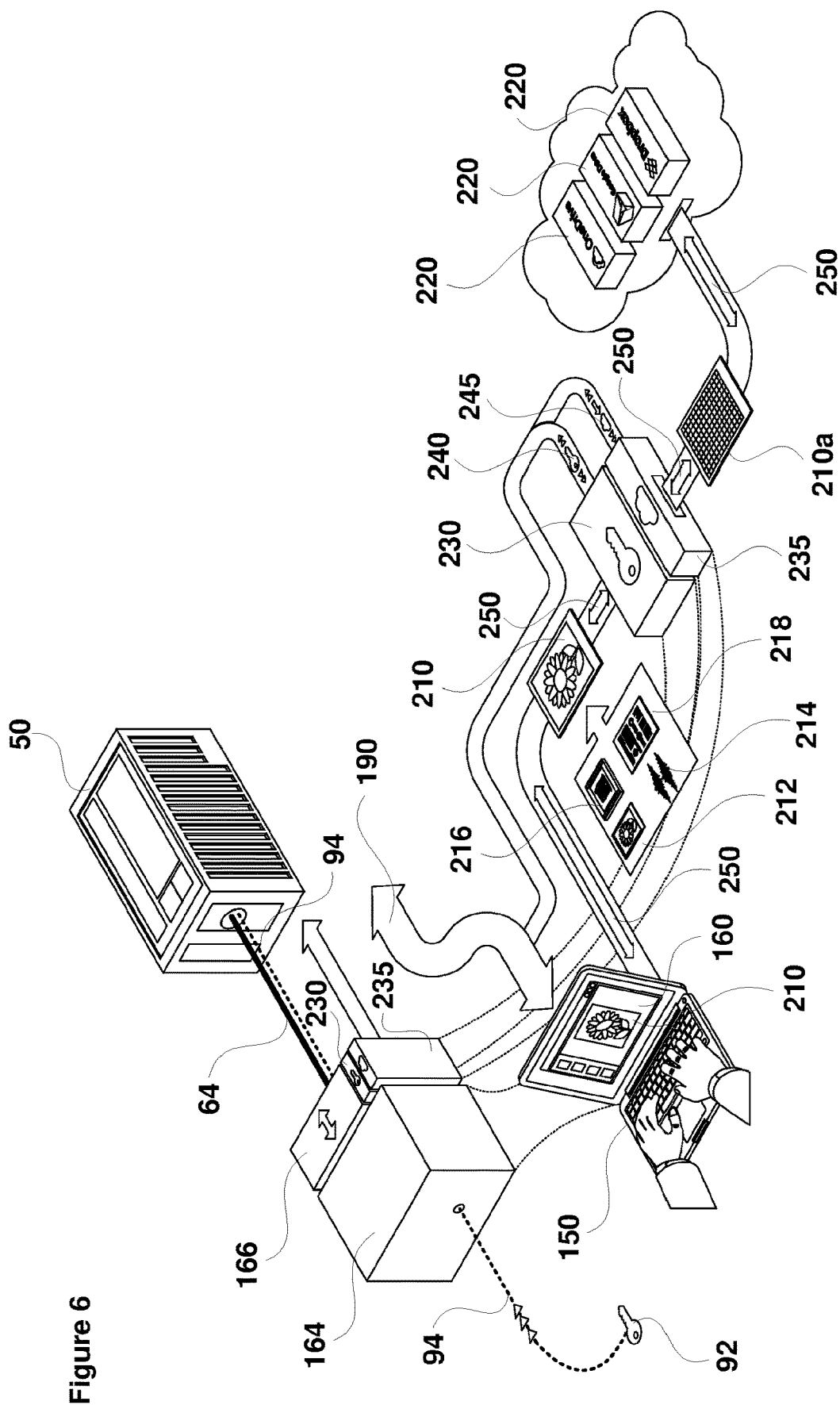
FIG. 6 illustrates handling of large data objects using secondary storage.

Handling of secondary (large object) data is shown with the aid of segment 600 in FIG. 6. Large data objects (210) such as photos (212), audio files (214), video files (216) or documents (218) are stored (250) as encrypted blocks of data (210*a*) using traditional cloud storage providers (220) (although specialised cloud storage could be an option). The PVDN service provider (10) provides library components (166) for secondary data handling to facilitate the building of customer applications (164,160) including library components (230) for encryption of secondary data and library components (235) for storage on cloud providers. User devices (150) uses customer applications (164,160) to encrypt the data (210) (using randomly generated keys (240)) and obtain a cryptographic hash of the object and then store (250) the result objects (210*a*) as files with the cloud storage provider. The credentials and details for accessing the cloud storage provider are stored as part of the primary data and are obtained on demand by the PVDN enabled application. The encryption key (240), hash and location of the object (245), along with file details, are then stored in the customer primary data (100*a*) via the PVDN hub microservice (105). Other PVDN applications on other devices may obtain the keys and other file information from customer primary data and use them to download and decrypt the files. In this way large data objects (files) can be backed up and shared amongst the customer devices and applications on the PVDN. It is envisaged that the preferred storage would be content based, using advantageous file block sizes and directory management techniques, with appropriate indexing facilities to allow the most advantageous search methods to locate files.

Application Containers preferably encrypt (230) customer file data as it is provided to the PVDN secondary storage facility and decrypt (230) same as it is retrieved from the PVDN secondary storage facility using encryption keys (240) generated by the system and stored in the PVDN primary storage facility. Preferably, communication lines (64) are also encrypted which may be effected by use of the HTTPS protocol wherein the encryption for communications in accordance with this protocol generate their own encryption keys with the end points of the encrypted tunnel including the device (150) and the PVDN hub microservice (105) in the Application Container to prevent 'man in the middle' attacks on any data transferred.

In another embodiment, the primary encryption key (92) that protects primary data while at rest is entered on demand by the customer (94) thereby avoiding the requirement to store the primary encryption key anywhere in the system other than in volatile memory.

In the event the system is restarted, either due to failure, deliberate restart or an Application Container upgrade, the primary encryption key may again be entered on demand by the customer and cannot be retrieved by the system from anywhere within the system. The primary encryption key may include a passphrase, security token or similar mechanism for providing strong encryption keys in a user friendly manner.

In a preferred embodiment, Application Containers are pre-configured regarding the services provided and have facilities for remote access and remote control of the Application Container. The control and data access mechanism may be web-based.

Further, the container hosting service provider will provide services to Application Containers with ports and secondary storage memory space pre-configured and available for provision to many Application Containers.

In a preferred embodiment, remote control and access provided by a PVDN is restricted to pre-defined actions. For example, actions may be restricted solely to actions such as executing a query, executing a copy command and/or an insert command regarding customer record and file data. Restricting actions to pre-defined functions that may be implemented by the PVDN further enhances security associated with operations that may be performed upon customer file data and hence, increases confidence regarding any unauthorised access or operations with respect to customer file data. Such functions may be assigned various security and permission levels to further enhance security. New versions of the PVDN host microservice with a new enhanced set of pre-defined actions would likely be released from time to time. A customer may cease tenancy of an instance of the microservice of an older version and commence tenancy of an instance of a newer version of the microservice in order to effect an upgrade of services. According to this arrangement, the customer's encrypted data at rest could be transferred from one container to another so that the enhanced PVDN could resume without customer data loss.

As described above, the system provides an efficient and cost effective solution to provide online data storage to customers that takes advantage of the cost efficiencies of storing data for a large number of customers, whilst also providing a service in which customers can be confident that their personal and private data cannot be accessed and shared without their knowledge and authorization. The data storage that is "device agnostic" receiving and storing data from any smartphone or computer tablet/personal computer manufacturer for which a PVDN enabled application exists, thereby removing reliance upon the online data storage services provided by any particular device manufacturer.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to imply the inclusion of a stated feature or step, or group of features or steps, but not the exclusion of any other feature or step or group of features or steps.

The invention claimed is:

1. An online data storage and retrieval system comprising:
a Personal Virtual Data Network (PVDN) operating on standard networking protocols which securely connect internet connected devices belonging to a customer to a centralised data store;
a service host configured to execute containerisation software for running multiple instances of PVDN application containers,
wherein the PVDN application containers have appropriate pre-configured separations such that data storage for the customer, computer processes operating upon customer data, and communication channels across which the customer data is communicated, are separated from all other data storage, computer processes and communication channels used for other customers, the separation achieved by the use of the PVDN application containers effecting Operating System Level Virtualisation;
wherein the microservices provided by the PVDN application containers include:
a Personal Virtual Data Network (PVDN) Hub including primary storage facilities comprising record-based data stored by the microservices on the PVDN application containers that effect storage and access functions necessary to enable services to operate the PVDN, and wherein the PVDN Hub includes:
a secondary storage facility for receiving encrypted client data (PVDN secondary data) and storage of the PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities,
wherein the control system further includes a control server running a client portal and a tenancy controller, the tenancy controller allocates one or more of the PVDN application containers for the hosting of the microservices to a customer, thereby reducing the role of the service host to solely providing the allocation of the PVDN application containers with the appropriate pre-configured separations, and wherein the PVDN application containers, apart from communicating with the tenancy controller that controls the ownership of PVDN application containers, solely house and serve the PVDN Hubs including the PVDN primary storage facilities.

2. The online data storage and retrieval system according to claim 1, wherein the computer instruction code implementing the PVDN application container is replicated and executed to provide the services of the PVDN Hubs to individual customers.

3. The online data storage and retrieval system according to claim 1, wherein customer passwords and/or any access method for a customer to access their PVDN beyond the initialisation of the PVDN is restricted to the customer's PVDN application container.

4. The online data storage and retrieval system according to claim 1, wherein the PVDN primary storage facility solely stores the customer data required to synchronise data between PVDN enabled devices and credentials to enable customers to authenticate and connect to their PVDN along with the credentials required for the customer to access data storage providers in relation to the customer's data storage requirements.

5. The online data storage and retrieval system according to claim 1, wherein the PVDN primary storage facility solely stores credentials and access requirements for customers to access their data and controls the PVDN secondary storage facility without performing any data transfers therebetween.

6. The online data storage and retrieval system according to claim 1, wherein customer devices external to the online storage and retrieval system include a PVDN application program that enables access to the customer's PVDN.

7. The online data storage and retrieval system according to claim 1, wherein the customer devices external to the online data storage and retrieval system include a PVDN application program that encrypts and decrypts files stored and retrieved respectively to and from the PVDN secondary storage facilities to ensure privacy of the data in the PVDN secondary storage facilities.

8. The online data storage and retrieval system according to claim 1, wherein the customer devices external to the online data storage and retrieval system include a PVDN application program that generates random encryption keys for storage of files in an encrypted format in the PVDN secondary storage facilities.

9. The online data storage and retrieval system according to claim 1, wherein the tenancy controller has no direct access to the customer's data that is managed by the customer's PVDN application container.

10. The online data storage and retrieval system according to claim 1, wherein the customer's PVDN application containers are allocated by a separate entity as compared with the entity that hosts the PVDN application container and the PVDN primary data and a further separate entity or entities that hosts the PVDN secondary data such that the separation of aspects of the online data storage and retrieval system is separate across three separate entities for the provision of the tenancy controller, the hosting of PVDN primary storage facilities and the operation of PVDN secondary storage facilities.

11. The online data storage and retrieval system according claim 1, wherein communication channels between the PVDN primary storage facility and the PVDN secondary storage facility are encrypted.

12. The online data storage and retrieval system according to claim 1, wherein the PVDN functions are restricted to a set of actions thereby further improving data security of the stored customer data.

13. A method of establishing an online data storage and retrieval system including the following steps:
securely connecting, by a Personal Virtual Data Network (PVDN) operating on standard networking protocols, internet connected devices belonging to a customer to a centralised data store;
executing, by a service host, containerisation software for running multiple instances of PVDN application containers, the PVDN application containers effecting Operating System Level Virtualisation, wherein the PVDN application containers have appropriate pre-configured separations such that data storage for the customer, computer processes operating upon customer data, and communication channels across which the customer data is communicated, are separated from all other data storage, computer processes and communication channels used for other customers;
establishing a Personal Virtual Data Network (PVDN) hub including primary storage facilities comprising record-based data stored by the microservices on the PVDN application containers to effect storage and access functions necessary to enable services to operate the PVDN;
wherein the PVDN includes a secondary storage facility for receiving encrypted client data (PVDN secondary data) and storage of the PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities;
wherein the method further includes allocating, by a control system including a control server running a client portal and a tenancy controller, the one or more PVDN application containers for hosting microservices to a customer, thereby reducing the role of the service host to solely providing the allocation of the PVDN application containers, and
wherein the PVDN application containers, apart from communicating with the tenancy controller that controls the ownership of PVDN application containers, solely house and serve the PVDN Hubs including the PVDN primary storage facilities.

14. The method of establishing an online data storage and retrieval system according to claim 13, wherein the computer instruction code implementing the PVDN application containers is replicated and executed to provide the services of the PVDN hubs to individual customers.

15. A non-transitory computer readable medium including computer instruction code that, when executed by a processor, causes:
a secure connection, by a Personal Virtual Data Network (PVDN) operating on standard networking protocols, of internet connected devices belonging to a customer to a centralised data store;
execution, by a service host, containerisation software for running multiple instances of PVDN application containers, the PVDN application containers effecting Operating System Level Virtualisation, wherein the PVDN application containers have appropriate pre-configured separations such that data storage for the customer, computer processes operating upon customer data, and communication channels across which the customer data is communicated, are separated from all other data storage, computer processes and communication channels used for other customers;

establishment of a Personal Virtual Data Network (PVDN) hub including primary storage facilities to effect storage and access functions necessary to enable services to operate the PVDN;

wherein the PVDN includes a secondary storage facility for receiving encrypted client data (PVDN secondary data) and storage of the PVDN secondary data in the secondary storage facility occurs under the control of the PVDN primary storage facility, the configuration of the online data storage and retrieval system thereby enabling customer devices including a PVDN application program external to the online data storage and retrieval system to transfer data directly between external devices and the customer's PVDN secondary storage facilities;

wherein the computer instruction code further causes allocation, by a control system including a control server running a client portal and a tenancy controller, of the one or more PVDN application containers for hosting microservices to a customer, thereby reducing the role of the service host to solely providing the allocation of the PVDN application containers, and wherein the PVDN application containers, apart from communicating with the tenancy controller that controls the ownership of PVDN application containers, solely house and serve the PVDN Hubs including the PVDN primary storage facilities.

* * * * *